United States Patent Office 2,934,577
Patented Apr. 26, 1960

2,934,577

PROCESS FOR STABILIZING MONOVINYLACETYLENE CONTAINING REACTIVE IMPURITIES

James Warren Graham, North Muskegon, Mich., assignor to E. I. du Pont de Nemours and Company, Wilmington, Del., a corporation of Delaware No Drawing. Application June 20, 1958
Serial No. 743,493

8 Claims. (Cl. 260—678)

This invention is directed to a method for stabilizing acetylene dimers and trimers during their distillation, handling and storage. In particular, the present invention concerns a process for stabilizing monovinylacetylene containing impurities such as divinylacetylene, 1,3-hexadien-5-yne, butatriene, chloroprene, vinyl chloride and acetaldehyde.

Monovinylacetylene, which is an important neoprene intermediate, is prepared from acetylene by a continuous process similar to that described in U.S. Patent 2,759,985. Humidified acetylene rises through a series of communicating reaction zones at a temperature between about 60 and 75° C. where it is contacted counter currently by an aqueous acidified solution of cuprous chloride. About 2–25% conversion occurs each time the acetylene passes through the reactor. The warm humid mixture obtained is dried and cooled so that the monovinylacetylene can be separated from the acetylene by fractionation or absorption in a solvent such as acetone; this step is described in U.S. Patent 2,796,448. This monovinylacetylene contains impurities such as divinylacetylene, 1,3-hexadien-5-yne, butatrine, chloroprene, vinyl chloride and acetaldehyde; this resulting mixture is not entirely stable and will deposit an insoluble solid from either the vapor or the liquid phase. This polymer formation necessitates inconvenient and costly cleaning operations. For example, when an acetone solution of monovinylacetylene and the impurities is introduced into a column which is under total reflux, polymer is deposited so rapidly in the packing elements that the equipment must be shut down for cleaning operations approximately once a week.

The process by which this polymer forms is unknown. Agents such as sodium nitrite and nitrogen dioxide which are effective for inhibiting the growth of butadiene-1,3, "popcorn" polymers are not, in general, effective for stabilizing dimers and trimers of acetylene containing impurities; nitrogen dioxide actually promotes acetylene polymer growth. Monovinylacetylene prepared from acetylene usually contains these described impurities. Divinylacetylene, 1,3-hexadien-5-yne, and butatriene-1,2,3 may be present along with traces of aldehydes and unsaturated chlorobodies. Interaction of one or more of these impurities (except divinylacetylene) with the monovinylacetylene by a process as yet not understood appears to cause this solid polymer formation; neither pure monovinylacetylene nor a mixture of pure monovinylacetylene and divinylacetylene give solid polymer.

It is an object of the present invention to stabilize monovinylacetylene containing impurities and obviate undesired polymer formation. Accordingly, it is a further object of the present invention to provide a method for stabilizing monovinylacetylene containing impurities, and to more specifically provide a process for stabilizing mixtures containing monovinylacetylene and small amounts of divinylacetylene, 1,3-hexadien-5-yne, butatriene, chloropreen, vinylchloride and acetaldehyde. It is a further object to provide a method for facilitating the distillation, handling, and storage of monovinylacetylene. It is a yet still further object to provide a process for retarding solid polymer formation from monovinylacetylene containing impurities and to provide an improved process for the recovery of monovinylacetylene from its impurities and acetone solution.

These and other objects will become apparent in the following description and claims.

More specifically, the present invention is directed to a process for retarding the formation of solid polymer in monovinylacetylene containing impurities which process comprises contacting said monovinylacetylene with 1 to 1,000 parts per million by weight of a sulfide selected from the group consisting of group I metal sulfides, group II metal sulfides, transition metal sulfides, and hydrogen sulfide. The transition metal sulfides contemplated by the present invention are selected from the group consisting of iron sulfide, cobalt sulfide and nickel sulfide.

The process of the present invention provides a unique and economical way to stabilize dimers and trimers of acetylene, particularly monovinylacetylene, containing impurities which normally cause the formation of solid polymer. The stabilized compositions can, as a result of the present invention, be conveniently distilled, handled, and stored at temperatures ranging between about −70 to 90° C. Solid polymer formation is distinctly retarded as long as the acetylene compounds are contacted with the defined sulfides which may be present as solid particles, in solution, or, in the case of hydrogen sulfide, as a gas. Sodium sulfide, potassium sulfide, calcium sulfide, barium sulfide, mercuric sulfide, copper sulfide, and iron sulfide are representative examples of sulfides which may be employed as crystals. Sodium sulfide, potassium sulfide, and cesium sulfide, are representative examples of sulfides which may be employed as aqueous solutions. When organic solutions of the soluble sulfides are used, the preferred organic solvents are polar compounds such as acetone or ethanol.

In a preferred embodiment of the present invention about 60 parts per million of sodium sulfide is used to stabilize monovinylacetylene containing impurities including divinylacetylene, 1,3-hexadien-5-yne, butatriene, and traces of chloroprene, vinylchloride, and acetaldehyde.

The representative examples which follow illustrate the present invention but it is not intended that the invention be limited to these examples.

Example 1

A. A 1½% solution of sodium sulfide is prepared with water which has been demineralized to prevent the formation of insoluble sulfides. It is protected against air oxidation by storage under an inert atmosphere in a steel tank. During the separation of monovinylacetylene from acetone and impurities including divinylacetylene, 1,3-hexadien-5-yne, butatriene-1,2,3 and traces of aldehydes and unsaturated chlorobodies, this solution is fed by a metering pump to the top of a monovinylacetylene refining column. A solution of monovinylacetylene in acetone enters farther down the column at a temperature of about 85° C. 0.4 pound of the sulfide solution is used for every 100 pounds of monovinylacetylene (60 p.p.m.). Inside the column the monovinylacetylene rises counter current to the sodium sulfide solution and leaves the top of the column at a temperature of about 22° C. From there it goes to a scrubbing tower and the purified monovinylacetylene is subsequently collected and stored. The sodium sulfide solution in the refining column is washed down the column with refluxing liquid and is eventually purged from the column with the distillation heels. About once every three months the packing of this column must be cleaned.

B. Essentially the same results are obtained if a 3.0% aqueous solution of sodium sulfide is used in place of the 1.5% solution in the procedure of part A above (120 p.p.m. of sulfide).

C. Essentially the same results are obtained if the procedure of part A is repeated except that 1.6 pounds of the 3% solution of sodium sulfide (480 p.p.m. sulfide) is employed for every 100 pounds of monovinylacetylene introduced into the refining column.

D. Essentially the same results are obtained if a 1.5% aqueous solution of sodium sulfide (240 p.p.m. sulfide) is substituted for the 3% solution of sodium sulfide in the procedure of part C above.

E. The procedure of part A is repeated except that no sodium sulfide solution is used. The monovinylacetylene refining column must be shut down and cleaned within a week.

*Example 2*

A. A few crystals of sodium sulfide are placed in a 30-ml. heavy-walled glass bulb equipped with a 6" heavy-walled capillary stem. The bulb is swept with nitrogen while being cooled to −70° C. The bulb is then filled ⅓ full with a liquid mixture of monovinylacetylene with divinylacetylene and traces of 3-hexadien-5-yne, butatriene, vinyl chloride, chloroprene and acetaldehyde. While the bulb is still cold, the capillary stem is closed. The bulb is subsequently warmed to room temperature and kept at 35° C. for about 16 hours. No deposits of solid polymer form.

B. Similar results are obtained when potassium sulfide, calcium sulfide, barium sulfide, mercuric sulfide, copper sulfide, iron sulfide, and gaseous hydrogen sulfide are, in turn, substituted for the sodium sulfide in the process of part A above.

C. When a control experiment is run in which no sulfide is used, yellowish solid polymer forms inside the bulb.

It is evident from the results of the above examples that any of the sulfides of the defined group may be used to keep impure dimers and trimers of acetylene from forming solid polymer. When the process is used in the isolation of monovinylacetylene, sodium sulfide is preferred. Generally about 60 parts per million of sulfide is employed although it is to be understood that as little as 1 part per million provides some protection. There is no practical advantage in using above 1000 parts per million of sulfide. Disulfides, polysulfides, sulfites, and sulfates should not be present because they tend to deactivate the sulfide.

Although the present invention is particularly useful for stabilizing monovinylacetylene solutions containing impurities which include divinylacetylene, 1,3-hexadien-5-yne, butatriene, chloroprene, vinylchloride, and acetaldehyde, it is to be understood that it may also be used to stabilize butatriene and divinylacetylene containing impurities. Since butatriene polymerizes completely in a very short interval of time at normal temperatures, application of the present invention thereto is considered to be particularly important.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for retarding the formation of solid polymer in monovinylacetylene containing reactive impurities, said monovinylacetylene being prepared from acetylene, said process comprising the contacting at −70 to 90° C., of said monovinylacetylene with from 1 to 1000 parts per million by weight of a sulfide selected from the group consisting of group I metal sulfides, group II metal sulfides, a transition metal sulfide taken from the group consisting of iron sulfide, cobalt sulfide and nickel sulfide, and hydrogen sulfide.

2. The process of claim 1 wherein the said impurities comprise divinylacetylene, 1,3-hexadien-5-yne and butatriene.

3. A process for retarding the formation of solid polymer in monovinylacetylene containing reactive impurities, said monovinylacetylene being prepared from acetylene, said process comprising contacting said monovinylacetylene at −70 to 90° C. with 60 to 1000 parts per million by weight of a sulfide selected from the group consisting of group I metal sulfides, group II metal sulfides, a transition metal sulfide taken from the group consisting of iron sulfide, cobalt sulfide and nickel sulfide, and hydrogen sulfide.

4. A process for retarding the formation of solid polymer in monovinylacetylene containing reactive impurities, said monovinylacetylene being prepared from acetylene, said process comprising contacting said monovinylacetylene at −70 to 90° C. with 60 to 1000 parts per million by weight of a sulfide selected from the group consisting of group I metal sulfides.

5. The process of claim 4 wherein the group I metal sulfide is sodium sulfide.

6. The process of claim 4 wherein the said impurities comprise divinylacetylene, 1,3-hexadien-5-yne and butatriene.

7. The process of claim 1 wherein the said impurities comprise chloroprene and butatriene.

8. The process of claim 4 wherein the said impurities comprise chloroprene and butatriene.

References Cited in the file of this patent

UNITED STATES PATENTS

| | | |
|---|---|---|
| 2,182,528 | Stamatoff | Dec. 5, 1939 |
| 2,407,861 | Wolk | Sept. 17, 1946 |
| 2,458,494 | Durland | Jan. 11, 1949 |
| 2,526,962 | Morris | Oct. 24, 1950 |
| 2,715,103 | Nelson | Aug. 9, 1955 |